US011204463B1

(12) United States Patent
Fasano et al.

(10) Patent No.: US 11,204,463 B1
(45) Date of Patent: Dec. 21, 2021

(54) INTEGRATED CIRCUIT STRUCTURE WITH OPTICAL ABSORBER LAYER OVER OPTICAL GRATING COUPLER

(71) Applicant: GLOBALFOUNDRIES U.S. Inc., Santa Clara, CA (US)

(72) Inventors: Benjamin V. Fasano, New Windsor, NY (US); Andreas D. Stricker, Essex Junction, VT (US); Hanyi Ding, Colchester, VT (US); Yusheng Bian, Ballston Lake, NY (US); Bo Peng, Sharon, MA (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 11 days.

(21) Appl. No.: 16/931,771

(22) Filed: Jul. 17, 2020

(51) Int. Cl.
*G02B 6/122* (2006.01)
*G02B 6/12* (2006.01)

(52) U.S. Cl.
CPC .. *G02B 6/1225* (2013.01); *G02B 2006/12061* (2013.01); *G02B 2006/12073* (2013.01); *G02B 2006/12107* (2013.01); *G02B 2006/12126* (2013.01)

(58) Field of Classification Search
CPC ........ G02B 6/1225; G02B 2006/12061; G02B 2006/12073; G02B 2006/12107; G02B 2006/12126
See application file for complete search history.

(56) References Cited

U.S. PATENT DOCUMENTS

| | | | |
|---|---|---|---|
| 5,949,934 A * | 9/1999 | Shima | G02B 6/021 385/37 |
| 7,446,877 B2 * | 11/2008 | Li | G01J 3/02 356/326 |
| 9,086,387 B2 | 7/2015 | Assefa et al. | |
| 9,234,854 B2 * | 1/2016 | Assefa | G01M 11/33 |
| 9,239,507 B2 | 1/2016 | Chen et al. | |
| 9,703,043 B2 * | 7/2017 | Chen | G02B 6/124 |
| 2007/0279636 A1 * | 12/2007 | Li | G01J 3/1895 356/451 |
| 2014/0010253 A1 * | 1/2014 | Sysak | H01S 5/0265 372/45.012 |
| 2014/0268113 A1 * | 9/2014 | Assefa | G01N 21/00 356/73.1 |
| 2014/0268120 A1 * | 9/2014 | Assefa | G01N 21/00 356/237.5 |
| 2015/0117808 A1 * | 4/2015 | Chen | G02B 6/29328 385/2 |
| 2016/0147019 A1 * | 5/2016 | Chen | G02B 6/124 385/2 |
| 2021/0091246 A1 * | 3/2021 | Chern | H01L 31/022408 |

OTHER PUBLICATIONS

K. Giewont et al., "300-mm Monolithic Silicon Photonics Foundry Technology," IEEE Journal of Selected Topics in Quantum Electronics, vol. 25, No. 5, Sep./Oct. 2019, 12 pages.

\* cited by examiner

*Primary Examiner* — Andrew Jordan

(74) *Attorney, Agent, or Firm* — Hoffman Warnick LLC

(57) ABSTRACT

Embodiments of the disclosure provide an integrated circuit (IC) structure, including an optical medium for light signals; and an optical grating coupler coupled to the optical medium. The optical grating coupler is configured to reorient light from the optical medium. A cladding material is over the optical grating coupler. An absorber layer is over the cladding material, and vertically above the optical grating coupler.

20 Claims, 7 Drawing Sheets

INTEGRATED CIRCUIT STRUCTURE WITH OPTICAL ABSORBER LAYER OVER OPTICAL GRATING COUPLER

TECHNICAL FIELD

Embodiments of the disclosure relate generally to structures for photonic integrated circuits (PIC). More specifically, the disclosure relates to an integrated circuit structure with an absorber layer over an optical grating coupler used for testing of the PIC.

BACKGROUND

Semiconductor chips may be modified, adapted, etc., to house the various components needed to transmit light from one component to another. Semiconductor chips, which include photonic devices and microcircuitry, are known as "photonic integrated circuits" (PICs). PIC dies typically include optical components to transmit light into and from the optical devices therein such as grating couplers. The various optical components, e.g., photonic waveguides, photonic transmitters and receivers, etc., can relay signals through light transmission. A technical challenge associated with PIC technology is the forming of structures for analyzing the optical performance of a PIC die. In some cases, structures for testing may affect the performance and/or other parameters of interest. For example, the grating coupler for optical testing may continue leaking the signal if left in place, and may cause back-reflections that can cause device performance degradation.

SUMMARY

Aspects of the present disclosure provide an optical medium for light signals; an optical grating coupler coupled to the optical medium, wherein the optical grating coupler is configured to reorient light from the optical medium; a cladding material over the optical grating coupler; and an absorber layer over the cladding material, and vertically above the optical grating coupler.

Further aspects of the present disclosure provide an integrated circuit (IC) structure, including: an optical medium for light signals; an optical grating coupler coupled to the optical medium, wherein the optical grating coupler is configured to reorient light from the optical medium; a cladding material over the optical grating coupler; and an absorber layer above the optical grating coupler and the cladding material, wherein at least a portion of the cladding material is vertically above the optical grating coupler.

Yet another aspect of the present disclosure provides integrated circuit (IC) structure, including: a substrate; a cladding material over the substrate, wherein the cladding material includes a dielectric material; an optical medium configured to carry light signals, and embedded within the cladding material between an upper surface and a lower surface of the cladding material; an optical grating coupler coupled to the optical medium, wherein the optical grating coupler is configured to reorient light from the optical medium through the cladding material; an absorber layer on the cladding material and above the optical grating coupler, wherein least a portion of the cladding material is vertically between the optical grating coupler and the absorber layer.

BRIEF DESCRIPTION OF THE DRAWINGS

These and other features of this disclosure will be more readily understood from the detailed description of the various aspects of the disclosure taken in conjunction with the accompanying drawings that depict various embodiments of the disclosure, in which.

Figure 1:
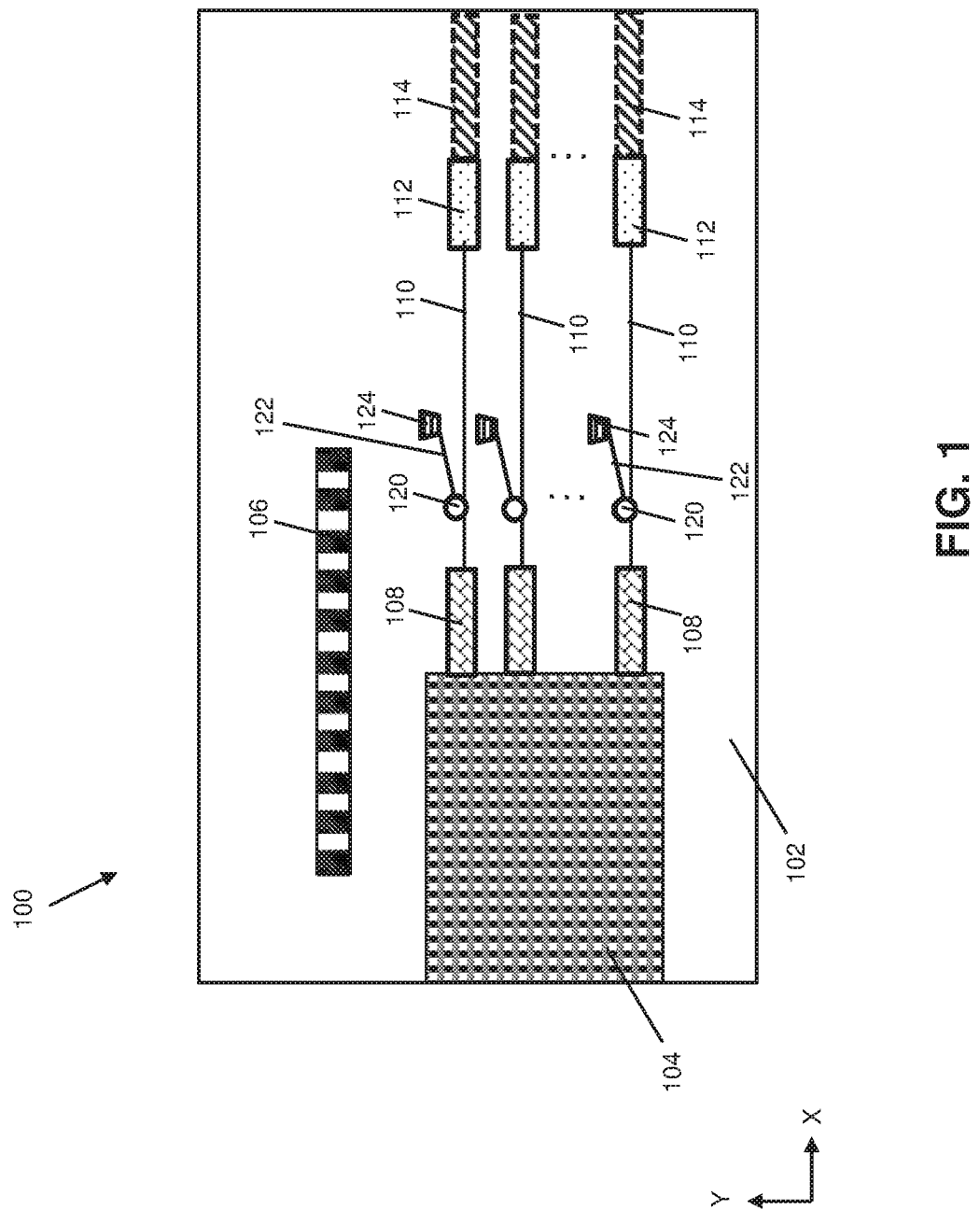
FIG. 1 shows a plan view of a photonic integrated circuit (PIC) die that includes an integrated circuit (IC) structure according to embodiments of the disclosure.

It is noted that the drawings of the disclosure are not necessarily to scale. The drawings are intended to depict typical aspects of the disclosure, and therefore should not be considered as limiting the scope of the disclosure. In the drawings, like numbering represents like elements between the drawings.

DETAILED DESCRIPTION

In the description herein, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made within the scope of the present teachings. The description herein is, therefore, merely illustrative.

The present disclosure relates to integrated circuit (IC) structures for photonic integrated circuit (PIC) dies. Some PIC dies may include optical taps to analyze optical transmission loss and/or other performance parameters. Such taps may include components (e.g., optical grating couplers) for sending light into and/or from the PIC toward optical measuring devices and/or to allow light to be introduced into the PIC, for instance a laser source. Optical testing occurs as part of the manufacturing of the device structure concludes. Additional materials are formed over the optical tap, and the later-formed materials may include arrangements, which may reduce light reflected back into the PIC (i.e., "back-reflection"). The reflected light that re-enters the PIC may destabilize the optical signals.

Embodiments of the disclosure may provide a PIC with an optical element (e.g., a functional photonic circuit and/or a light-transmitting element thereof) and an optical grating coupler to analyze transmission loss and other optical performance parameters in a PIC. An absorber layer is over the optical grating coupler to reduce and/or prevent the light leakage and back-reflections post-manufacture. The absorber layer may be formed in cladding material for enclosing the grating coupler optical grating coupler. The PIC thus may be analyzed for transmission loss and other optical performance parameters, and then the absorber layer is formed to effectively reduce and/or prevent the light leakage and back-reflection.

Embodiments of the disclosure may be implemented in multiple configurations. In one example, an IC structure according to the disclosure may be at a location where V-grooves are not used. In such cases, there is no way to reliably optically probe into V-grooves since the edges of each die are not cut to expose the V-groove to insert fibers therein. In this case, grating couplers may process the input laser light (i.e., accept a light signal), and produce a light output. These grating couplers may cause back-reflections if they are not disabled in the final product. A further setting where embodiments of the disclosure may be implemented, is where there is an "on-die" laser. In this case, the laser light is coupled to a silicon waveguide. This type of optical coupling is analyzed to confirm power levels using a grating coupler. However, once analysis via electrical probes and optical fibers aligned to grating couplers concludes, the grating couplers conventionally are left on the structure and may create light emission during field operation. The grating couplers also need to be prevented from creating back-reflections, as back reflections in some cases may destabilize laser wavelength stability. Embodiments of the disclosure use absorbing material(s) to effectively disable further operation of grating couplers.

Referring initially to FIG. 1, a plan view of a portion of a device 100 is shown according to embodiments of the disclosure. Device 100 may include and/or be formed on a PIC die 102 having various electrical and/or optical media for transmitting signals across device 100, and/or from one device 100 to another. Device 100 may include active circuitry 104, e.g., various circuits, devices, etc., for implementing electrical and optical functions. Active circuitry 104 may also include a suitable light source such as a laser whose emitted light can be used to create optically modulated signals for data transmission. PIC die 102 may additionally include a set of electrical pads 106, which may be coupled to active circuitry 104 through wires and/or other conductive regions (not shown) within the body of PIC die 102. PIC die 102 may include a set of optical converters 108 coupled between active circuitry 104 and a connecting waveguide 110. Waveguide 110 may take the form of a separate waveguide, and/or in some cases may be at least one light-transmitting elements of active circuitry 104 itself. Optical converters 108 may take the form of any element configured to transform signals transmitted from active circuitry 104 into optical signals, and/or vice versa. Connecting waveguide 110 may be coupled to respective optical converter(s) 108 to transmit and receive optical signals.

In PIC die 102, a connecting waveguide(s) 110 may be aligned with a respective optical component 112 (e.g., an optical mode field converter and/or spot size converter) to couple light from optical fibers into a waveguide by first machining and/or forming a v-groove 114 into the body of PIC die 102. Each optical component 112 aligns with respective v-grooves 114. V-grooves 114 generally do not serve functional purposes apart from during manufacture and/or subassembly analysis of components. Optical grating couplers 124, as discussed herein, are used for optical surface probing in combination with electrical probes for powering and testing attached devices, including lasers, driver circuits, amplifiers, signal conditioners and the like. A reliable optical coupling between active circuitry 104 to optical element(s) 112 through connecting waveguide 110 is desired for transmitting signals between various elements of device 100, and/or between multiple devices 100. Thus, the manufacture of device 100 is concerned with ensuring the PIC is operable upon completing manufacturing, assembly, and deployment.

To analyze the performance of device 100, various elements may be manufactured on, and/or coupled to, waveguide(s) 110. At least one waveguide(s) 110 may be coupled to an optical tap 120 including an optical medium 122 (e.g., at least one light-propagating elements such as a branch waveguide, and/or other light-propagating material of active circuitry 104 and/or coupled to active circuitry 104). Optical medium 122 extends outward from its corresponding connecting waveguide 110 to terminate at an optical grating coupler 124. Optical grating coupler 124 is configured to transmit light from optical medium 122 to components located outside of, and aligned with, PIC die 102. However, the presence of optical tap 120 in device 100 may continue leaking light and thus interfere with the operation of device 100 in a final product. Specifically, light may continue to enter optical tap 120 and leak outside the device 100, and may be reflected back to the device 100 by other structures, and thereby may destabilize the PIC and/or laser operation.

Figure 2:
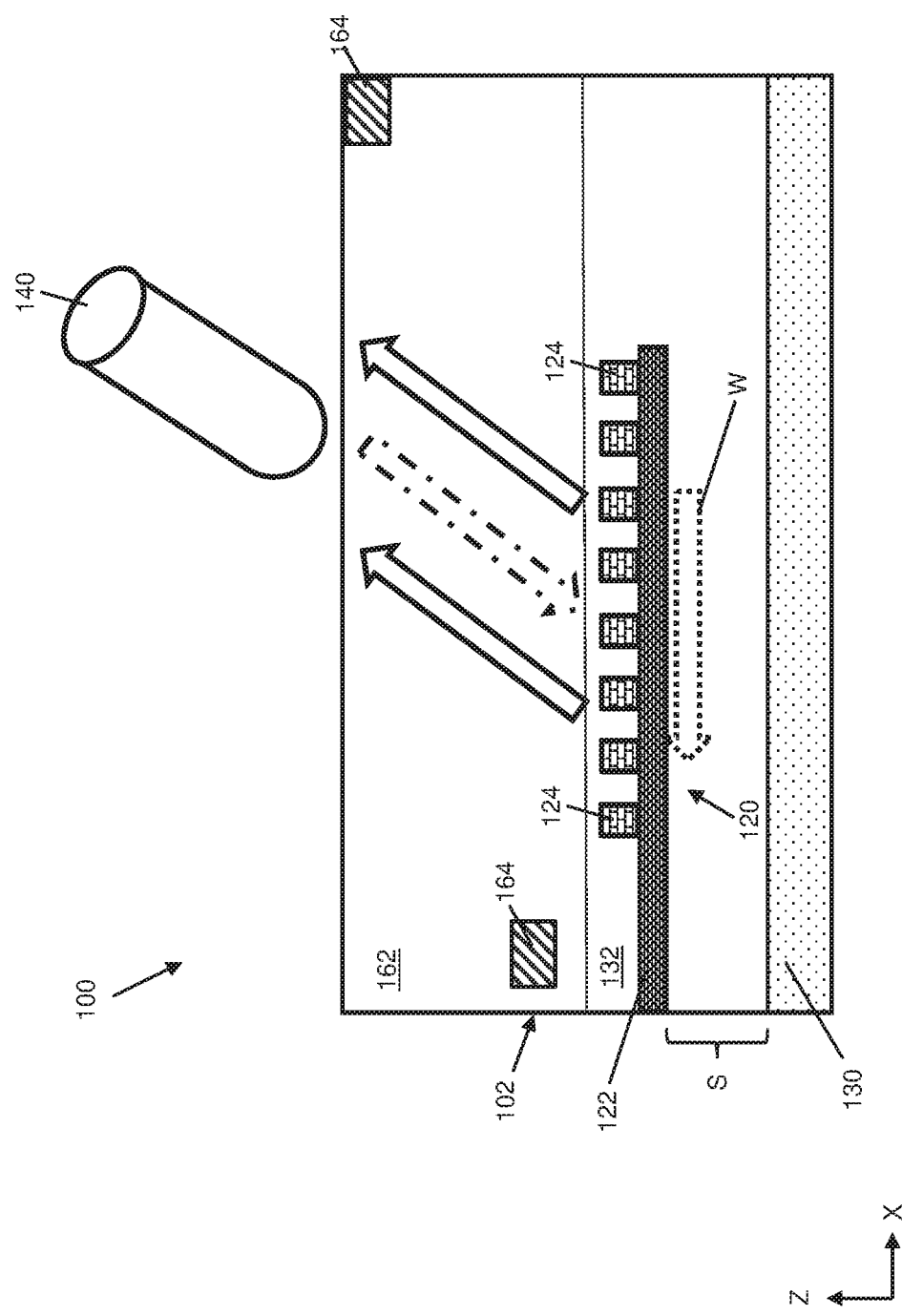
FIG. 2 shows a cross-sectional view of the PIC die during optical testing in methods according to embodiments of the disclosure.

Referring now to FIG. 2, a cross-sectional view of PIC die 102 illustrating a portion of optical tap 120 is shown to illustrate the analysis of device 100. As shown, PIC die 102 may include a substrate 130 at least partially composed of any conceivable semiconductor material, which may include: silicon, germanium, silicon germanium, silicon carbide, and substances including at least one III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each at least zero and X1+X2+X3+Y1+Y2+Y3+Y4=1 (1 being the total relative mole quantity). Other suitable substances may include II-VI compound semiconductors having a composition $Zn_{A1}Cd_{A2}Se_{B1}Te_{B2}$, where A1, A2, B1, and B2 are relative proportions each of at least zero and A1+A2+B1+B2=1 (1 being a total mole quantity).

A cladding material 132 may be formed of at least one insulative materials and may conformally coat optical medium 122 therein. Optical medium 122 may extend horizontally within cladding material 132, and as shown may laterally terminate within cladding material 132 beneath optical grating coupler 124. Cladding material 132 may be positioned in an area to be covered by back end of line (BEOL) processing layers, but in which no metal wires are over optical grating coupler 124. In such implementations, cladding material 132 may be the same region of material that is used to electrically separate a semiconductor region (e.g., such as that used for a field effect transistor) from underlying semiconductive materials. Cladding material 132, in any case, can separate substrate 130 from optical medium 122 and/or overlying portions of the PIC die structure. A separation distance S between substrate 130 and optical medium 122 thereabove may be at least approximately one micrometer (μm), and in some cases may be as large as at least one-hundred μm. Other portions of cladding material 132 may cover optical medium 122 and optical grating coupler 124.

Cladding material 132 may be composed of at least one oxide compound, and/or any conceivable electrically insulative substances. As examples, cladding material 132 may include materials such as: silicon nitride ($Si_3N_4$), silicon oxide ($SiO_2$), fluorinated $SiO_2$ (FSG), hydrogenated silicon oxycarbide (SiCOH), porous SiCOH, boro-phospho-silicate glass (BPSG), silsesquioxanes, carbon (C) doped oxides (i.e., organosilicates) that include atoms of silicon (Si), carbon (C), oxygen (O), and/or hydrogen (H), thermosetting polyarylene ethers, SiLK (a polyarylene ether available from Dow Chemical Corporation), near frictionless carbon (NFC), a spin-on silicon-carbon containing polymer material available from JSR Corporation, other low dielectric constant (<3.9) material, and/or layers thereof. Regardless of the material(s) used therein, cladding material 132 may be formed of a transparent and/or translucent material, capable of allowing light to pass substantially unimpeded therethrough.

Optical grating coupler 124 may be on an upper surface of optical medium 122. Optical grating coupler 124 may take the form of, e.g., multiple regions of dielectric material positioned in contact with optical medium 122 material thereunder. Optical grating coupler 124, which may be embodied as a spot size converter and/or other optical conversion element, collects light beams from optical medium 122 to be sent vertically upward through cladding material 132. In such cases, optical medium 122 may include a silicon and/or silicon dioxide-based waveguide. In still further implementations, optical medium 122 may be formed of silicon and optical grating coupler 124 may be formed of polycrystalline silicon, and/or other silicon materials with light-propagation properties. Optical grating coupler 124 can send light beams from within optical medium 122 toward an optical probe 140, e.g., a lensed fiber probe and/or similar instrument. Optical probe 140 may be positioned over optical grating coupler 124 to analyze the transmission loss and other performance parameters of the PIC optical medium 122. Optical probe 140 may operate, e.g., by sensing light that optical grating coupler 124 sends vertically through cladding material 132. An operator of optical probe 140 can analyze light intensity, wavelength, etc., to analyze whether any information within an optical signal of connecting device 100 (FIG. 1) has been lost. In some cases, other reflective elements above device 100 may return light toward optical grating coupler 124 and optical medium 122 of optical tap 120, as indicated by phantom arrow W. Embodiments of the disclosure provide additional structures to substantially reduce/prevent, back-reflection of light into optical tap 120.

Figure 3:
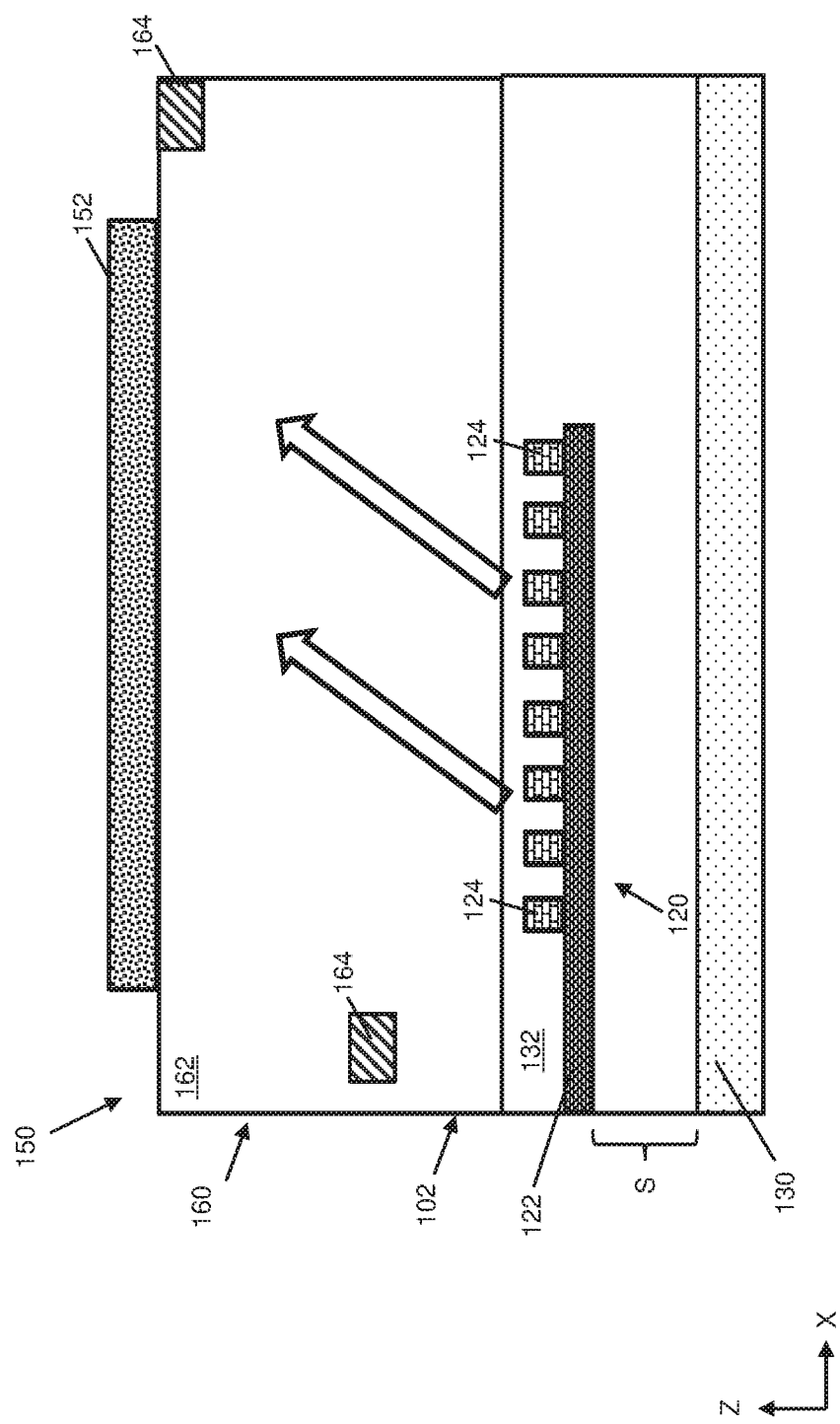
FIG. 3 shows a cross-sectional view of the PIC die and IC structure upon completing optical testing according to embodiments of the disclosure.

Referring now to FIG. 3, an integrated circuit structure 150 may be formed from PIC die 102 according to various embodiments of the disclosure. Continued manufacture may include forming a back-end-of-line (BEOL) stack 160 of at least one metallization layer 164 over cladding material 132. Metallization layer 164 may include several distinct layers, each of which may be structured to include metal wires and/or vias of a device, in addition to other materials discussed herein. For clarity of illustration, two metallization layers 164 are shown, though it is understood that many devices will have as many as five, ten, fifteen, twenty, etc., metal layers. Back end of line stack 160 may include an insulator layer 162 (e.g., an inter-level dielectric (ILD) material)) configured to electrically and mechanically separate conductive materials within back end of line stack 160 from other structures. Insulator layer 162 may be formed of, and/or otherwise include, at least one materials used in cladding material 132 and/or may include any conceivable insulative material. Metallization layers 164 may provide an interconnect scheme, e.g., to electrical connections between various device structures and/or to other components such as external structures and/or devices. Each metallization layer 164 may be used to interconnect circuit elements of PIC die 102, e.g., multiple transistors and/or other elements via multiple metal wires and/or other components. Metallization layers 164 may be formed of copper and/or other metals suitable for serving as a conductive wire and/or via in an IC structure. In this configuration, metallization layers 164 must not block light transmitted from optical grating coupler 124 by being displaced from, and/or out of alignment with, optical grating coupler 124.

An absorber layer 152 may be formed on the top surface of the back end of line stack 160 and vertically above the location of optical grating coupler 124. Absorber layer 152 material may be formed of any material capable of absorbing incident light with little to no reflection. Materials suitable for use as, and/or within, absorber layer 152 may include any material having a refractive index of at least approximately 1.5. Such materials may include, e.g., at least one resinous materials capable of being coated and cured, an epoxy having at least one of germanium and/or silicon particles, and/or other light-absorptive materials. Such materials may be formed to a thickness of up to approximately ten μm, and may remain during manufacture and/or upon deployment of a device. Where applicable, metallization layers 164 are physically separated and horizontally displaced from absorber layer 152. The horizontal separation between absorber layer 152 and metallization layers 164 may be sufficient to prevent any blocking of light traveling from optical grating coupler 124 into absorber layer 152.

Figure 4:
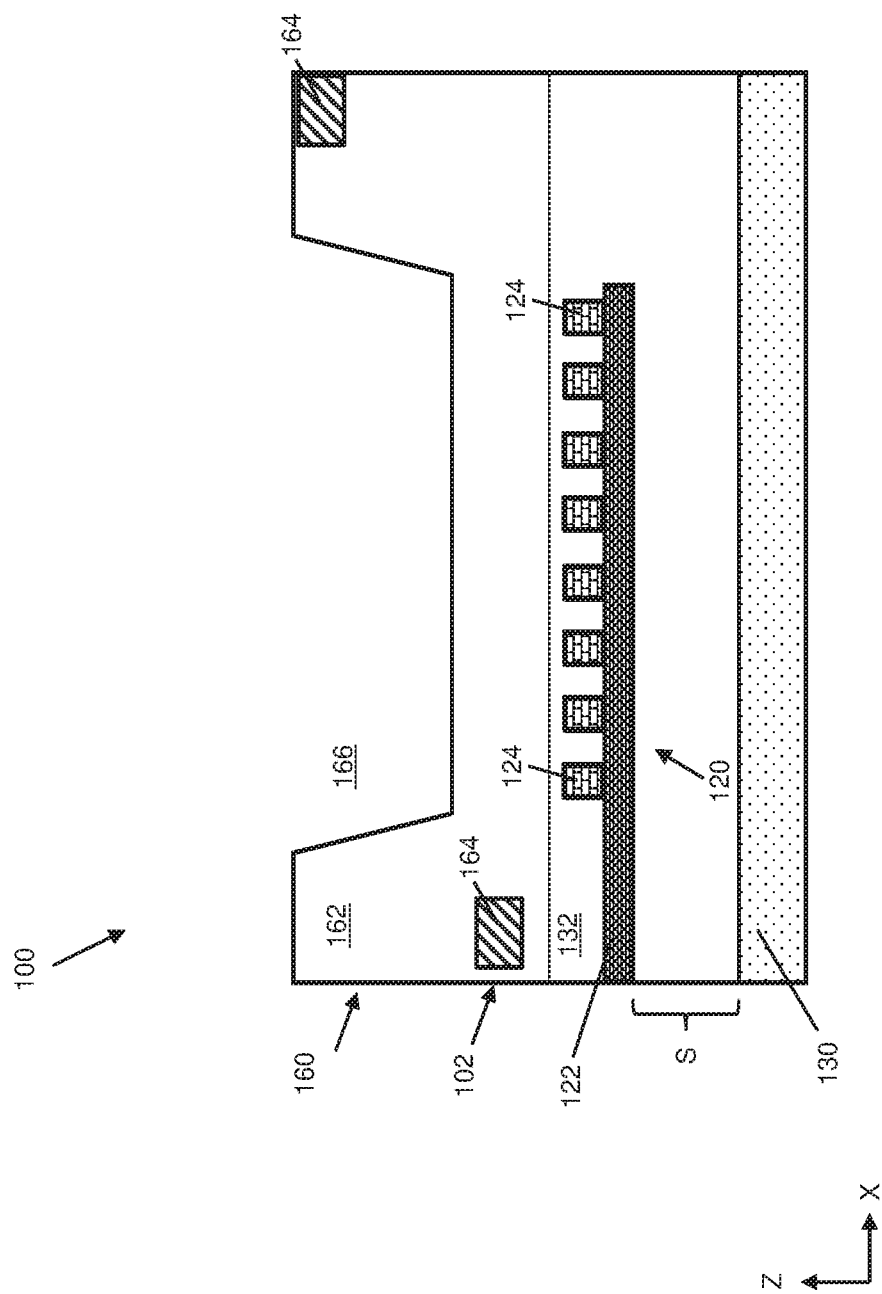
FIG. 4 shows a cross-sectional view of the PIC die with an overlying trench upon completing optical testing in methods according to the disclosure.

Referring now to FIG. 4, device 100 may be processed post-analysis to include absorptive material within other portions of PIC die 102 in various alternative implementations. According to an example, portions of back end of line stack 160 may be removed (e.g., via any conceivable process to target and remove selected material) to form a cavity 166.

Figure 5:
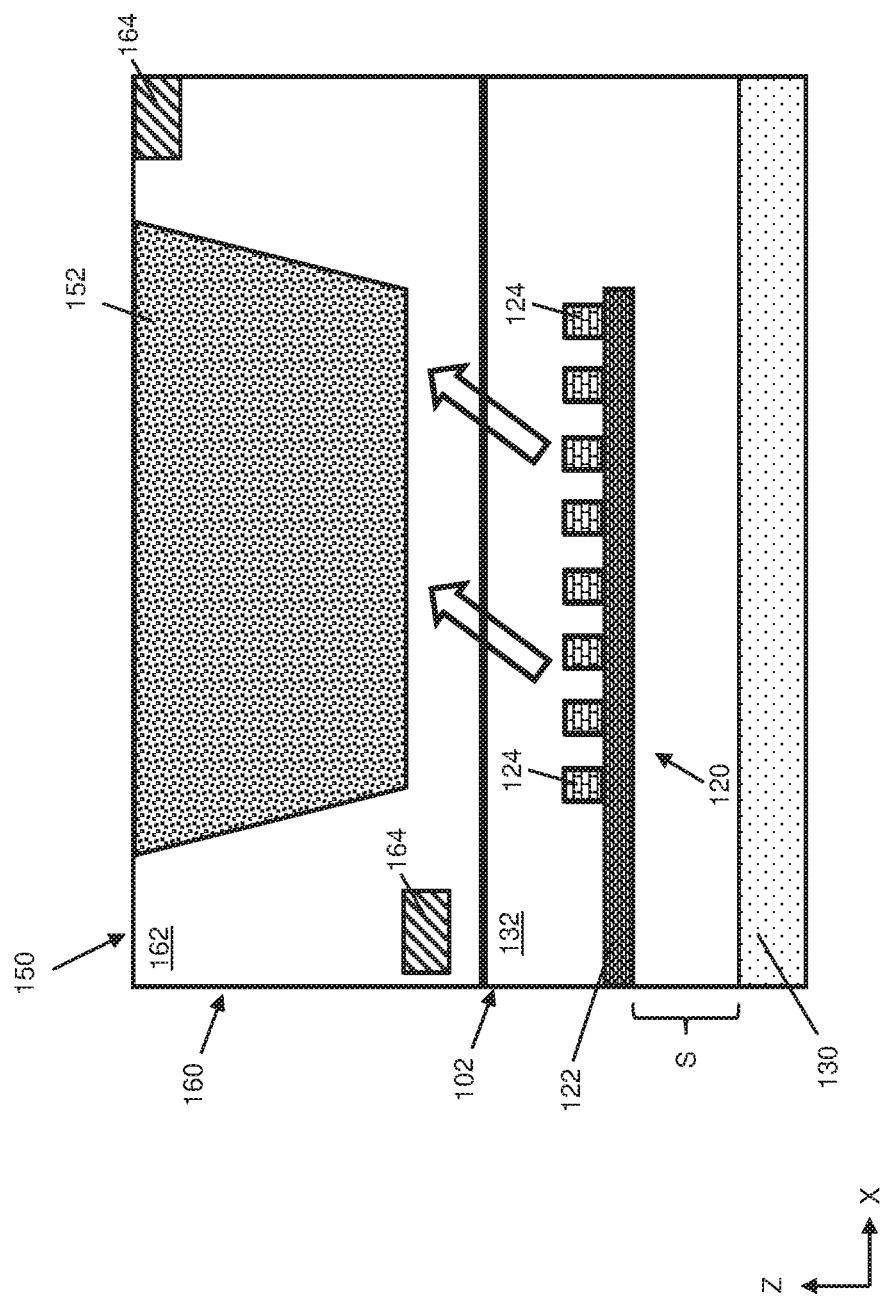
FIG. 5 shows a cross-sectional view of the PIC die and IC structure upon completing optical testing according to further embodiments of the disclosure.

Turning to FIG. 5, cavity 166 (FIG. 4) provides a location where absorber layer 152 is formed. For instance, at least one example material used to create absorber layer 152 may be formed (e.g., by precision injection, deposition and removing, etc.) within cavity 166 such that absorber layer is embedded within back end of line stack 160. Despite being formed in an alternative location, absorber layer 152 may remain vertically above optical grating coupler 124 and thus is capable of absorbing any light that passes into optical tap 120.

Figure 6:
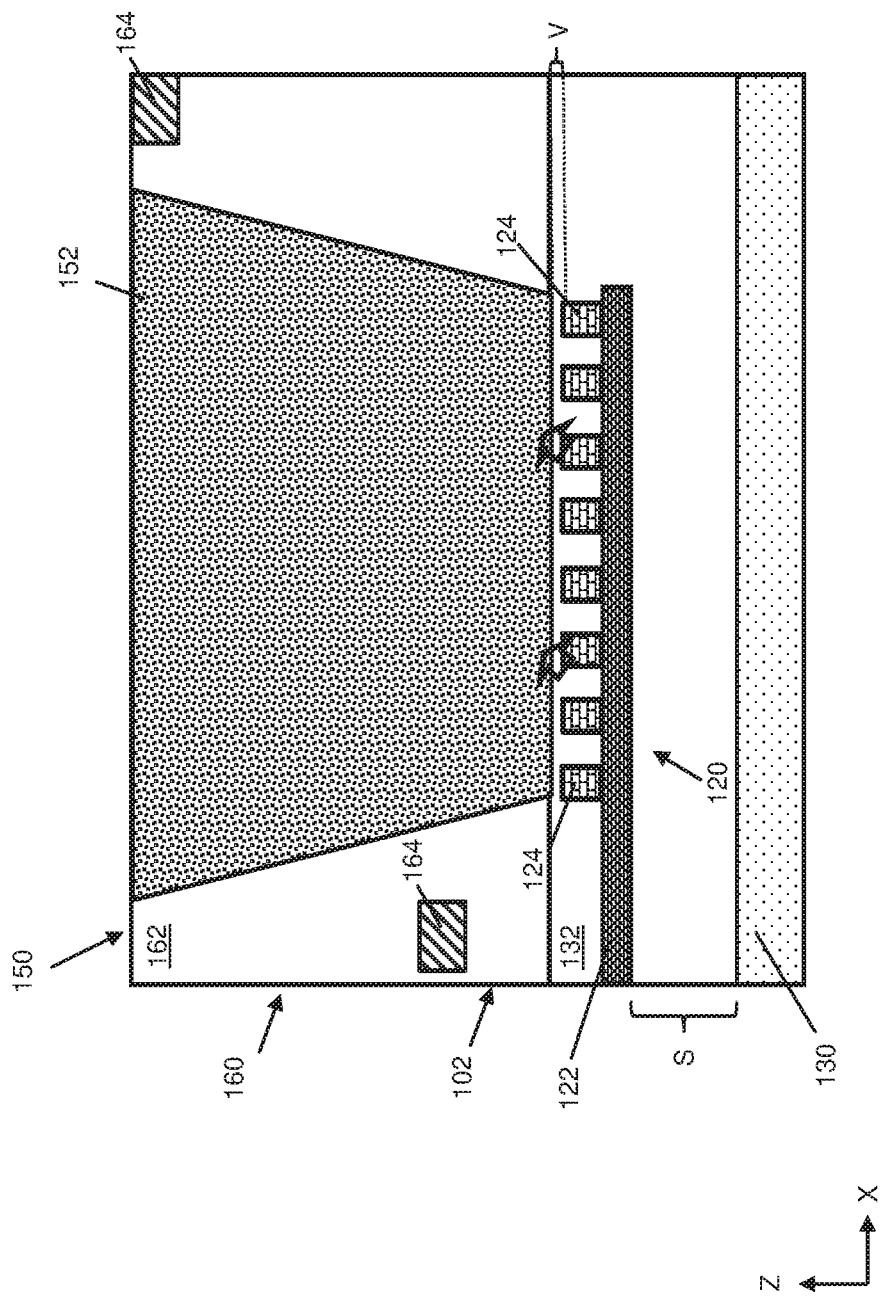
FIG. 6 shows a cross-sectional view of the PIC die and IC structure upon completing optical testing according to still further embodiments of the disclosure.

FIG. 6 depicts a further example of forming absorber layer 152 within cavity 166 (FIG. 4) of back end of line stack 160. In some cases, absorber layer 152 may extend to significant depths beneath the upper surface of back end of line stack 160. For instance, the lowermost surface of absorber layer 152 may be vertically proximate the upper surface of optical grating coupler 124, such that a vertical separation V between optical grating coupler 124 and absorber layer 152 is approximately 1.0 μm. The size of vertical separation V may be controllable, e.g., based on the size of cavity 166 and/or the amount of material used to form absorber layer 152 within back end of line stack 160.

Figure 7:
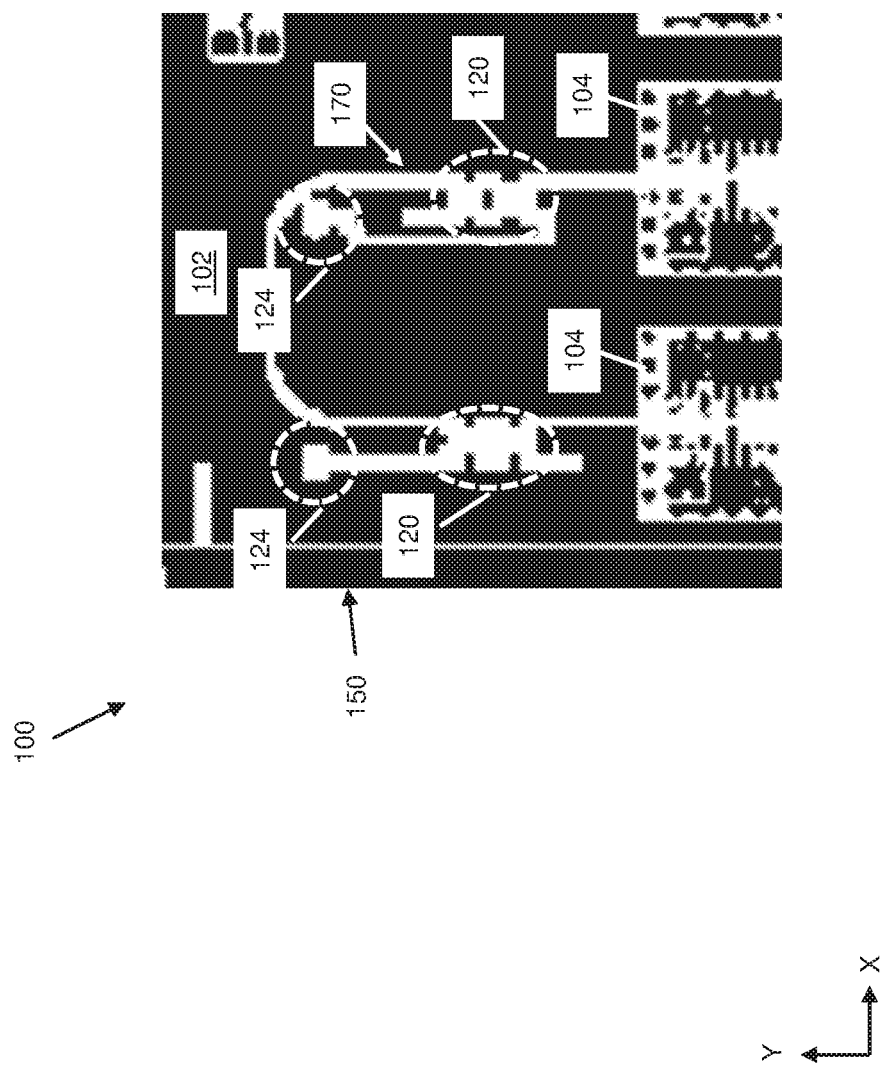
FIG. 7 shows a PIC die with a loopback region with an IC structure integrated therein, according to embodiments of the disclosure.

Turning to FIG. 7, a partial plan view of device 100 is shown according to further embodiments. Although IC structure 150 is effective when used with optical taps 120 between active circuitry 104 and v-groove(s) 114 (FIG. 1), embodiments of the disclosure are also effective for optical taps 120 located between at least two regions of active circuitry 104. For instance, various embodiments of PIC die 102 may include an intermediate waveguide 170 coupled between two portions of active circuitry 104. The connected portions of active circuitry 104 each may take the form of two respective device components within PIC die 102. Intermediate waveguide 170 may have a u-shaped bend extending between each portion of active circuitry 104, and intermediate waveguide 170 may include multiple optical taps 120, each structured to feed/collect light for analysis of transmission loss and other performance parameters of the active circuitry 104. Despite differences in the location of optical taps 120 in PIC die 102 as compared to other implementations, a cross-sectional view of optical tap 120 may be at least substantially similar to the X-Z cross-sections shown elsewhere herein, e.g., in FIGS. 3, 5, and/or 6.

Referring to FIGS. 1, 3, 5, and 7 together, embodiments of the disclosure may provide several technical and commercial advantages, some of which are discussed herein by way of example. Embodiments of the disclosure may permit optical analysis of various performance parameters like transmission loss within PIC die 102 in substantially the same manner as conventional structures, e.g., by allowing optical probes 140 to be placed above optical grating coupler 124 to prevent interference by absorber layer. Absorber layer 152 may be formed vertically over optical grating coupler(s) 124 to prevent light emitting and reduce reflection back to the PIC elements. Although optical taps 120 will continue to receive a portion of light from their corresponding waveguides 110, 170, this light will be absorbed by the overlying absorber layer 152 in device 100. Thus, absorber layer(s) 152 will reduce/prevent light leakage and back-reflections in device 100 once transmission loss and other performance parameters have been verified during manufacture. The above-noted features allow embodiments of the disclosure to be integrated easily into existing processing schemes, with the addition of forming absorber layer(s) 152, and where applicable, cavities 166 for absorber layer(s) 152 within back end of line stack 160 above optical grating coupler(s) 124.

The descriptions of the various embodiments of the present disclosure have been presented for purposes of illustration, but are not intended to be exhaustive and/or limited to the embodiments disclosed. Many modifications and variations will be apparent to those of ordinary skill in the art within the scope and spirit of the described embodiments The terminology used herein was chosen to best explain the principles of the embodiments, the practical application and/or technical improvement over technologies found in the marketplace, and/or to enable others of ordinary skill in the art to understand the embodiments disclosed herein.

What is claimed is:

1. An integrated circuit (IC) structure, comprising:
   an optical medium for light signals;
   an optical grating coupler coupled to the optical medium, wherein the optical grating coupler is configured to reorient light from the optical medium;
   a cladding material over the optical grating coupler; and
   an absorber layer over the cladding material, and vertically above the optical grating coupler.

2. The IC structure of claim 1, wherein the optical medium comprises an optical tap between the optical medium and a silicon waveguide (SWG) structure.

3. The IC structure of claim 1, wherein the optical medium laterally terminates within the cladding material beneath the optical grating coupler.

4. The IC structure of claim 1, wherein the absorber layer includes a material having a refractive index of at least approximately 1.5.

5. The IC structure of claim 4, wherein the material includes an epoxy.

6. The IC structure of claim 1, wherein the cladding material includes a dielectric material on a substrate, wherein a portion of the dielectric material is vertically between the substrate and the optical medium.

7. The IC structure of claim 1, wherein the optical medium includes silicon, and wherein the optical grating coupler includes polycrystalline silicon.

8. The IC structure of claim 1, wherein the optical medium is coupled to an intermediate optical element having a u-shaped bend between two device components.

9. An integrated circuit (IC) structure, comprising:
   an optical medium for light signals;
   an optical grating coupler coupled to the optical medium, wherein the optical grating coupler is configured to reorient light from the optical medium;
   a cladding material over the optical grating coupler; and
   an absorber layer above the optical grating coupler and the cladding material, wherein at least a portion of the cladding material is vertically above the optical grating coupler.

10. The IC structure of claim 9, wherein a thickness of the portion of the cladding material between the optical grating coupler and the absorber layer is at least approximately 1.0 micrometers.

11. The IC structure of claim 9, wherein an upper surface of the absorber layer is substantially coplanar with an upper surface of a back end of line stack above the optical grating coupler.

12. The IC structure of claim 9, wherein the optical medium comprises an optical tap between the optical medium and a silicon waveguide (SWG) structure.

13. The IC structure of claim 12, wherein the optical medium laterally terminates within the cladding material beneath the optical grating coupler.

14. The IC structure of claim 9, wherein the absorber layer includes a material having a refractive index of at least approximately 1.5.

15. The IC structure of claim 9, further comprising the absorber layer and a metal wire within an insulator layer, wherein the absorber layer is above the optical grating coupler.

16. The IC structure of claim 9, wherein the optical medium is coupled to an intermediate optical element having a u-shaped bend between two device components.

17. An integrated circuit (IC) structure, comprising:
   a substrate;
   a cladding material over the substrate, wherein the cladding material includes a dielectric material;
   an optical medium configured to carry light signals, and embedded within the cladding material between an upper surface and a lower surface of the cladding material;
   an optical grating coupler coupled to the optical medium, wherein the optical grating coupler is configured to reorient light from the optical medium through the cladding material;
   an absorber layer on the cladding material and above the optical grating coupler, wherein least a portion of the cladding material is vertically between the optical grating coupler and the absorber layer.

18. The IC structure of claim 17, wherein an upper surface of the absorber layer is substantially coplanar with an upper surface of a back end of line stack above the cladding material.

19. The IC structure of claim 17, wherein the absorber layer includes an epoxy having a refractive index of at least approximately 1.5.

20. The IC structure of claim 17, wherein the optical medium includes an optical tap coupled to an intermediate optical element having a u-shaped bend between two device components.

* * * * *